United States Patent [19]

Heinz, Jr.

[11] 4,112,200
[45] * Sep. 5, 1978

[54] GALVANIC CELL HAVING A PRIMARY RADIAL SEAL AND A SECONDARY RESEALABLE VENT CLOSURE

[75] Inventor: Henry Heinz, Jr., Berea, Ohio

[73] Assignee: Union Carbide Corporation, New York, N.Y.

[*] Notice: The portion of the term of this patent subsequent to Apr. 26, 1994, has been disclaimed.

[21] Appl. No.: 811,592

[22] Filed: Jun. 30, 1977

[51] Int. Cl.² ............................................. H01M 2/12
[52] U.S. Cl. ..................................... 429/54; 429/166; 429/172; 429/173
[58] Field of Search ........................... 429/53–55, 429/57, 82, 84, 86, 89, 166, 171–174, 184, 185

[56] References Cited

U.S. PATENT DOCUMENTS

| 2,542,576 | 2/1951 | Ruben | 429/166 X |
| 2,948,768 | 8/1960 | Ruben | 429/166 X |
| 3,723,184 | 3/1973 | Stark et al. | 429/174 X |
| 4,010,405 | 3/1977 | West | 429/53 X |
| 4,020,241 | 4/1977 | Heinz, Jr. | 429/54 |

*Primary Examiner*—Anthony Skapars
*Attorney, Agent, or Firm*—Cornelius F. O'Brien

[57] ABSTRACT

A galvanic cell having a primary radial type seal in conjunction with a secondary resealable vent closure, said resealable vent closure comprising a resilient elastomeric sponge gasket disposed and compressed between the upper surface of the cell's cover and the rim of the cell's container, which is turned over the upper surface of the cover, so as to facilitate the venting of any high pressure gases that may escape past the radial seal while retaining liquid.

15 Claims, 7 Drawing Figures

GALVANIC CELL HAVING A PRIMARY RADIAL SEAL AND A SECONDARY RESEALABLE VENT CLOSURE

FIELD OF THE INVENTION

This invention relates to sealed galvanic dry cells, and more particularly to a cylindrical cell having a conventional radial type seal and a secondary, preferably resealable, vent closure for releasing any excess gas from inside the dry cell which is sufficiently high in pressure to escape through the radial seal while still retaining liquid.

BACKGROUND OF THE INVENTION

Galvanic cells may generate large quantities of gas under certain conditions during use. Since these cells are required to be tightly sealed at all times in order to prevent loss of electrolyte by evaporation or leakage, high internal gas pressures may develop. Such pressures may cause leakage, bulging or possible explosion of the cell if not properly vented. If a vent valve is employed, it generally is resealable in order to avoid drying out of the electrolyte over the life of the cell and to prevent ingress of oxygen from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

Another type of resealable pressure relief vent valve that has been tried is that disclosed and claimed in U.S. Pat. No. 3,293,081 issued to J. L. S. Daley on Dec. 20, 1966. This resealable vent valve basically includes an annular seal gasket, such as an O-ring, which is maintained in sealing position around the periphery of the vent orifice by means of an arc shaped resilient member or spring. The resilient member or spring is designed to yield and permit radial movement of the seal gasket so as to momentarily break the seal and allow the passage of gas through the vent orifice when a predetermined high internal gas pressure is reached inside the cell.

Another type of resealable vent is disclosed in U.S. Pat. No. 3,415,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momentarily break the seal and allow gas to escape through the vent orifice.

A major problem encountered with resealable pressure relief vent valves of the types just described is that they are bulky and/or difficult to incorporate into the cell assembly. Furthermore, these pressure relief vent valves are expensive to manufacture and most are not adaptable for incorporation into miniature size cells. In addition, some of the prior art resealable vents as exemplified by the foregoing patents are not suitable for low pressure venting.

An inexpensive low pressure resealable vent closure is disclosed in U.S. Pat. No. 4,020,241 to Henry Heinz, Jr. Specifically, a galvanic cell is disclosed having a resealable vent closure consisting of a resilient elastomeric sponge gasket disposed and compressed between the cover of the cell and the upper wall of the cell's container and designed to vent low pressure gas buildup along the cover-gasket interface and/or container-gasket interface.

An inexpensive high pressure vent closure is disclosed in U.S. application Ser. No. 782,401 filed in the name of T. R. Potts et al. on Mar. 29, 1977. Specifically, a galvanic cell is disclosed having a conventional radial seal and wherein at least one gas venting passage is disposed at the interface of the top surface of the cover and the curled over rim of the cell's container, said passage being defined as a recess in the cover disposed below the curled over rim and/or a notch in a portion of the curled over rim.

As discussed above, resealable, high pressure relief vent valves are generally bulky and/or difficult to incorporate into a cell assembly while low pressure vent means for some cell systems may not adequately and sufficiently prevent loss of electrolyte through leakage or prevent ingress of oxygen from the atmosphere which could cause wasteful corrosion of the anode.

It is, therefore, an important object of this invention to provide a primary high pressure seal in conjunction with a secondary resealable vent valve for use in a galvanic dry cell.

Another object of this invention is to provide a resealable venting means operable upon release of a primary high pressure seal for safely venting high pressure gases from within a cell.

Still another object of this invention is to provide a resealable vent valve as a backup seal for a primary high pressure seal vent for galvanic dry cells which requires a minimum number of parts and which is, therefore, easy to assemble and inexpensive to manufacture.

Another object of this invention is to provide a resilient elastomeric sponge gasket as the active member of a secondary vent seal.

Another object of this invention is to provide a resealable vent as a backup for a primary high pressure vent for galvanic cells and which is adaptable to various diameters of drawn or extruded cylindrical cell containers.

The foregoing and additional objects will become more fully apparent from the following description and the accompanying drawings.

SUMMARY OF THE INVENTION

The invention relates to a galvanic cell comprising a container having an open end and an inner disposed anode, a cathode within said container, a separator disposed between said anode and said cathode, an electrolyte disposed within said container, a cover for said container, and wherein an annular segment of the upper wall of the container and the cover is radially sealed with the rim of the container which extends beyond the radial seal turned over the top surface of the cover; the improvement wherein a resilient compressible elastomeric sponge gasket is compressed between the top surface of the cover and the rim of the container which is turned over the cover so as to insure an escape path at the interface of the cover and the rim of the container for gases escaping past the radial seal and to also provide, in some applications, a resealable vent.

The radial seal for use in this invention can be obtained by radially compressing an annular segment of the upper wall of the cell's container against the cover, by radially compressing the cell's cover and then assembling it within the upper wall of the cell's container forming a friction or interference fit therebetween, or by using any other technique such as drawing, etc. that will result in at least a seal at the interface of the cover and an annular segment of the upper wall of the container.

In conventional type galvanic cells, the upper wall of the container is sealed to the cover of the cell using a radial and/or crimped sealing technique. In Leclanche, zinc chloride or other galvanic cells, there is usually a tendency to have gas buildup within the cell during storage and/or use. As stated above, in designing a cell with only a low pressure venting system, although the gas will have a means for venting to the atmosphere, there is a tendency that water may evaporate from the cell or that air from the atmosphere may possibly leak into the cell over long periods of time, thus causing corrosion of the anode thereby shortening the service life of the cell. In addition, in low pressure venting systems, there is also a long term tendency for the electrolyte to creep or leak from the cell which could cause damage to the instrument or device in which the cell is incorporated. To provide an improved tighter seal for the cells, it has been found that an application of grease, such as silicone grease, can be applied to the interface of the upper portion of the inner container wall and the cover. This effectively seals the cells against low pressure leakage of electrolyte while simultaneously preventing premature drying out of the liquid components of the cell.

It has been found that when the upper extremity of the container wall is turned over and onto the cover of the cell using conventional techniques, the seal obtained through the use of the grease in combination with conventional radial and/or crimping sealing techniques is very effective. However, with the build up of gas pressure within the cell, the container wall expands to relax the radial seal and the cover is urged axially upward thereby securing and sealing the cover of the cell to the upper turned over portion of the container wall, thus blocking any path for the gas to escape. As a result, with the increase of pressure buildup within the cell, the seal becomes more effective against gas leakage. Although this is desirable, up to a point, it has the disadvantage that under abuse conditions, such as charging or high temperature environment, the gas pressure could continue to build up until it reaches a level where the cover may push out of the cell. This abusive use of the cell could damage the device in which the cell is used. To prevent the possibility of such damage, the present invention is directed to a secondary vent means disposed at the interface of the cover and the upper turned over portion or rim of the container wall, said vent means comprising a resiliently compressible elastomeric sponge gasket compressed between the upper surface of the cover and the rim of the container which is turned over the cover so as to facilitate the controlled venting of gases from within the cell upon release of the primary radial seal. As a result of this venting means, any excessive and high build up of pressure from within the cell escaping past the radial seal will vent at the interface of the cover and the rim of the container. Thus using the teachings of this invention, galvanic cells can be provided with an economical, reliable and resealable venting means operable upon release of the primary radial seal.

Commercial conventional cylindrical cells suitable for this invention, such as Leclanche dry cells, are of two main constructional types. In the "pasted" cells, the cathode depolarizer mix is impact or pressure molded to form a cylindrical bobbin containing a central cathode collector rod. This bobbin is later inserted into a cylindrical anode container together with a flowable separator paste or colloidal mass which is cooked or otherwise gelled to form an immobilized separator member between the metal container and the mix bobbin. In the construction of bobbin type cells, a substantial amount of the total cell electrolyte is added by way of the separator paste.

In the "lined" cell, the separator is applied to the inside wall of the metal container either as an adherent film or coating or as an inserted layer of coated paper. The wet cathode mix is extruded or rammed into position to fill a major portion of the lined container and then the central cathode collector rod is inserted directly into the rammed mix or into a hole made by a piercing rod. In this construction, virtually all of the cell electrolyte is added by way of the wet mix, which is, therefore, much wetter than used to mold bobbins.

As used herein, the rim of the container shall mean the top end and/or the side wall adjacent the top end of the container.

As used herein, a grease compound is intended to mean a noncurable, yieldable composition comprising such as silicone polymer, silicone-containing polymeric compounds, petroleum-based jellies or grease, and the like.

As used herein, an elastomeric sponge gasket shall mean a gasket made of a cellular material having the physical properties of natural, reclaimed, vulcanized or synthetic rubber. Preferably, the material should be a gas impervious material having a structure which is composed of a large number of non-interconnected pores or closed cells, be resilient, that is, capable of contracting under a compressive force and then substantially recovering to its original dimensions upon release of the compressive force; and for the venting of gases escaping through the primary radial seal, the material should preferably have at least 50% pores by volume and, more preferably, between about 65 and 90% pores in the uncompressed structure. The gasket will have an apparent density which is decreased substantially from the real density of the solid base material by the presence of numerous cells or pores disposed throughout its mass. Consequently, in the trade these spongy materials are usually characterized by their uncompressed apparent density. Primarily the gasket should be sufficiently resilient such that upon relaxation of the primary radial seal, the gas escaping through said radial seal will provide a sufficient force to temporarily deflect or further compress the gasket at the gasket-container rim interface and/or gasket-cover interface thus enabling the gas to vent.

Suitable material for use in this invention includes grades E 42 and E 43 of the closed cell expanded rubbers described in ASTM D-1056-68 which is incorporated herein by reference. Specific examples of material suitable for this invention include closed or open cell or pore neoprene (neoprene is the generic name for a synthetic rubber-like polymer made by polymerizing chloroprene [2-chloro-1,3-butadiene] or by polymerizing a mixture of polymerizable monomers, the major component of which is chloroprene), GR-S sponge rubber (standard GR-S is a copolymer of butadiene and styrene in the ratio of approximately 76.5 to 23.5 percent), sponge polyurethane, sponge butadiene, sponge nitrile rubber, sponge chlorosulfonated polyethylene, sponge ethylene-propylene terpolymer, butyl rubber, polyacrylates, etc. A process for making closed cell foam or sponge materials is described in Vol. 3, pages 82 to 110 of the Encyclopedia of Polymer Science and Technology, edited by Mark, Gaylord and Bikales and published by Wiley, 1965. This disclosure is incorporated herein by reference.

Of the above, closed cell neoprene has been found admirably suited for use in this invention. Although the composition of neoprene is as identified above, the term has been somewhat broadened through common usage and for the purpose of this invention to include commercial rubber-like compositions in which the major elastomeric constituent is neoprene.

The elastomeric sponge gasket for this invention must be resiliently compressible and preferably be of a cellular structure with at least about 50% pores, preferably between about 65 and 90% pores. This is necessary because contrary to gaskets of the prior art which were generally made of non-resilient materials, the gaskets of this invention have to be made of a resiliently compressible material so that when assembled in a cell as a resealable venting closure, high pressure gas escaping from within the cell through the primary radial seal will provide a sufficient force to effectively temporarily deflect or further compress the gasket at the gasket-container rim interface and/or gasket-cover interface so as to enable the gas to vent to the atmosphere. Once the gas pressure decreases, the resilient characteristic of the gasket will cause the gasket to return to its former compressed dimension thereby effectively resealing the cell and effectively preventing spew from leaking out of the cell. Thus the gasket will allow venting of gases from within the cell while preventing the subsequent ingress of gases from the atmosphere. The benefit of having a gasket made of a structure having a large number of non-interconnecting pores is that when the gasket is compressed due to an applied localized force, the resultant force will not be transmitted throughout the entire gasket structure but will be confined only to a small segment of the structure because the pores will provide space in which to absorb the material being compressed. This type of structure can generally be compressed or deflected at localized areas by the application of a small force or pressure. Thus closed cell resilient elastomers which are capable of being compressed by relatively small levels of pressure and which can return substantially to their original dimensions are ideally suited as gaskets for resealable vent closures for galvanic cells.

Open cell or pore sponge material can also be used in this invention since the seal provided is a backup or secondary seal which operates only after the primary radial seal of the cell relaxes under pressure. Although the use of open cell sponge has the possible disadvantage of allowing the ingress of oxygen from the atmosphere to the internal cell once the primary radial seal opens, it has the advantages of greater gas venting capacity thereby more positively preventing the cover from pushing out of the cell when subjected to abuse conditions, and of trapping or absorbing spew and thereby preventing the leakage of liquid from the cell. In general, the use of a closed cell sponge material would be preferable for cell applications in which a maximum service life is required.

The present invention will become more apparent from the following description thereof when considered together with the accompanying drawings which are set forth as being exemplary of embodiments of the present invention and are not intended, in any way, to be limitative thereof and wherein.

Figure 1:
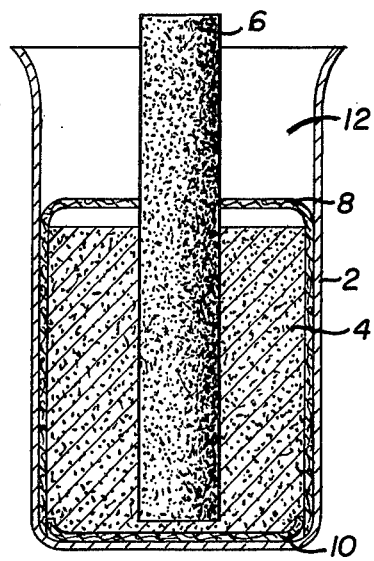
FIG. 1 is a sectional elevation taken through a partially assembled dry cell showing the cathode mix and the cathode collector rod within a container anode.

Referring in detail to FIG. 1, there is shown a partially assembled typical galvanic dry cell including a cylindrical container 2 which is made of an electrochemically consumable metal such as zinc and which serves as the anode for the cell. The cell container 2 includes therein a cathode depolarizer mix cake 4 containing, for example, manganese dioxide, a conductive material such as carbon black and an electrolyte. The cathode depolarizer mix cake 4 could be molded around a central cathode collector rod 6 or the cathode depolarizer mix 4 could be fed into container 2 as a wet mix containing virtually all of the cell's electrolyte and then the cathode collector rod 6 forced down into the center of the depolarizer mix 4. The cathode collector rod 6 could be a carbon rod impregnated with a wax or an organic resin to render it both liquid and gas impermeable. Whether the depolarizer mix is molded into a bobbin type structure in a separate operation prior to cell assembly or fed directly into the container 2 and packed therein, the cathode collector rod 6 is inserted into the depolarizer mix 4 such that its end protrudes through the open end of the container 2. A separator 8 surrounds the cathode depolarizer mix 4 and separates it from the inner side wall of the container 2 while a bottom cup separator 10 separates the depolarizer mix 4 from the bottom inner surface of the container 2. The separator may be a thin film separator, e.g., a thin bibulous paper coated with a paste. The top of the separator 8 is shown folded down on the depolarizer mix 4 thereby leaving the usual air space 12 to accommodate any liquid spew that may be formed on discharge of the cell.

Figure 2:
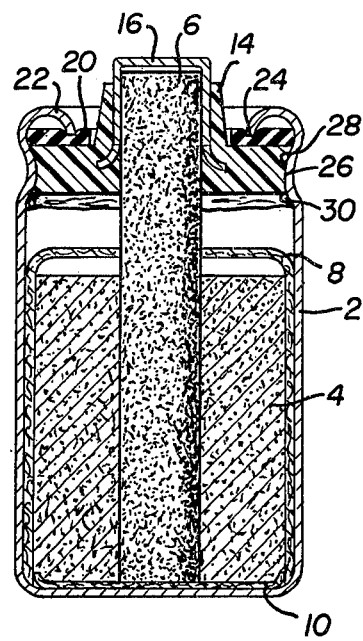
FIG. 2 is a sectional elevation taken through a fully assembled dry cell embodiment of the present invention but without a jacket or label.

FIG. 2 shows the same numbered components of FIG. 2 with the addition of a plastic closure or cover 14 molded with an electrode terminal cap 16 at its center. The cover 14 should be a rigid structure and would usually be made of plastic. As shown in FIG. 2, the upper portion of container 2 has been crimped and radially squeezed into the cover 14 thereby providing a high pressure primary seal thereat and an elastomeric sponge gasket 20 is shown disposed on top of the cover 14 with the rim 24 of container 2 curled over and compressed into gasket 20 thereby providing a venting means thereat. The gasket 20 should be compressed between the rim 22 of container 2 and the cover 14 by an amount to insure that gas escaping from within the cell upon opening or leakage of the primary radial seal will be able to further compress the gasket and vent through the gasket-container rim and/or gasket-cover interface. Once the gas vents, the gasket will automatically return to its original compressed dimension thereby resealing the cell.

A thin film of grease can be applied to the cover side wall 26 and/or the inner upper wall 28 of container 2 prior to assembling the cover 14 into the cell. As shown in FIG. 2, after the upper portion of container 2 is crimped and radially squeezed into the cover 14, a cell is produced having a high pressure primary seal. In this embodiment, a bead of grease 30 is usually formed adjacent the bottom of the cover 14 and inner wall of container 28. The rim 24 of container 2 is then curled over the cover 14 and embedded into gasket 20 thereby compressing gasket 20 between the rim 24 and cover 14. Without gasket 14, the rim 24 of container 2 would be embedded into the cover 14 and then if excessive gas buildup within the cell was to exert pressure against cover 14, the cover 14 would be urged axially upward thereby further securing and sealing the rim 24 of the container 2 to the cover 14. Consequently, without gasket 20 and with the increase of gas pressure within the cell under abuse conditions, the sealing would become more effective until the gas pressure reached a level sufficient to cause the cover to be physically ejected from the container 2. To eliminate this possibility, the use of an elastomeric sponge gasket 20 in accordance with this invention will enable gas escaping past the primary radial seal to deflect or further compress the gasket to create a vent at the gasket-container rim and/or gasket-cover interface through which the gas can escape to the atmosphere.

Figure 3:
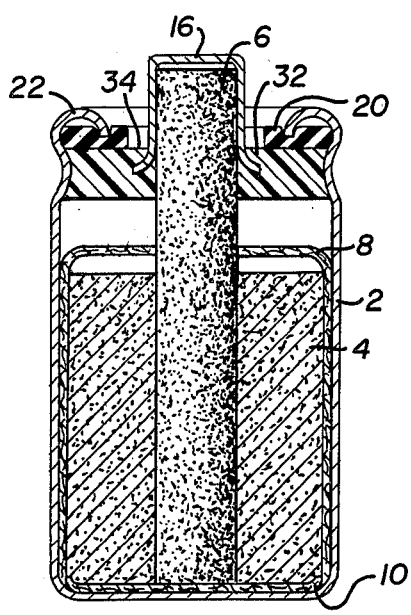
FIG. 3 is a sectional elevation taken through a fully assembled dry cell showing another embodiment of the present invention but without a jacket or label.
Figure 4:
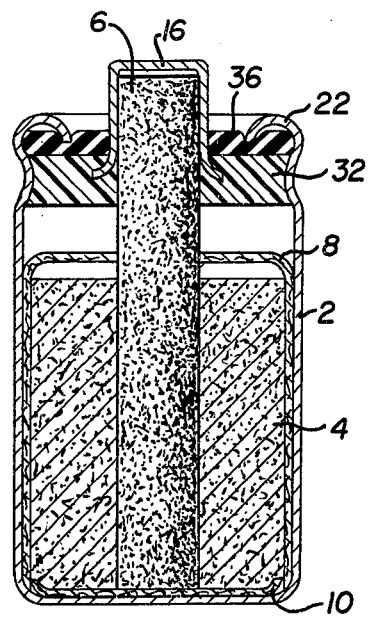
FIG. 4 is a sectional elevation taken through a fully assembled dry cell showing another embodiment of the present invention but without a jacket or label.

FIG. 3 shows another embodiment of the invention having similar component parts and identified with the same reference numbers as the cell shown in FIG. 2. The only difference is that the cover 32 is an annular member having a flat upper surface 34. FIG. 4 shows a cell having similar component parts and identified with the same reference numbers as the cell shown in FIG. 3 except that the elastomeric sponge gasket 36 extends across the upper surface 34 of cover 32 and contacts the terminal cap 16.

Figure 5:
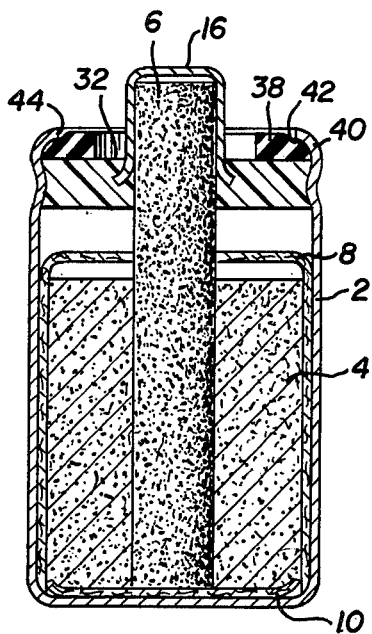
FIG. 5 is a sectional elevation taken through a fully assembled dry cell showing another embodiment of the present invention but without a jacket or label.

FIG. 5 shows another embodiment of the invention having similar component parts and identified with the same reference numbers as the cell shown in FIG. 3. The only difference is that rim 40 of container 2 is somewhat curled over sponge gasket 38 such that the wall 42 adjacent the terminal edge 44 is pressed against gasket 38. In this embodiment, the terminal edge 44 is not embedded and compressed into gasket 38 thus possibly providing an easier path for gas to vent to the atmosphere once the primary seal opens.

Figure 6:
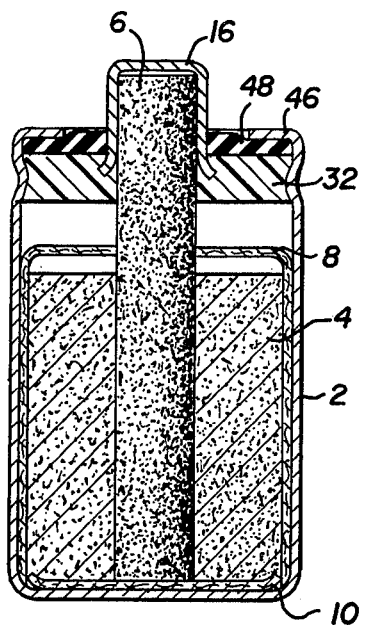
FIG. 6 is a sectional elevation taken through a fully assembled dry cell showing another embodiment of the present invention but without a jacket or label.
Figure 7:
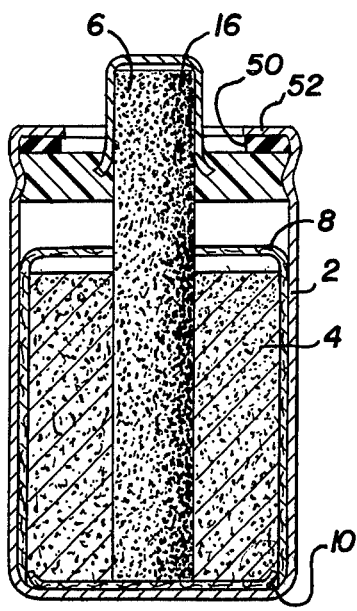
FIG. 7 is a sectional elevation taken through a fully assembled dry cell showing another embodiment of the present invention but without a jacket or label.

FIG. 6 shows another embodiment of the invention having similar component parts and identified with the same reference numbers as the cell shown in FIG. 5. The only difference is that the rim 46 of container 2 is turned flat over elastomeric sponge gasket 48 and extends further inward than the rim 40 of container 2 shown in FIG. 5. FIG. 7 shows a similar type cell except that the gasket 50 is compressed completely under the extended flat rim 52 of container 2.

It is to be understood that other modifications and changes to the preferred embodiment of the invention herein shown and described can also be made without departing from the spirit and scope of the invention.

What is claimed is:

1. In a galvanic cell comprising a container having an open end and an inner disposed anode, a cathode within said container, a separator disposed between said anode and said cathode, an electrolyte disposed within said container, a cover for said container, and wherein an annular segment of the upper wall of the container and the cover is radially sealed with the rim of the container which extends beyond the radial seal turned over the top surface of the cover; the improvement wherein a resiliently compressible elastomeric sponge gasket is compressed between the top surface of the cover and the rim of the container which is turned over the cover.

2. In the galvanic cell of claim 1 wherein the resiliently compressible elastomeric sponge gasket is composed of a large number of non-interconnected pores thereby providing a resealable vent closure at the interface of the cover and the rim of the container.

3. In the galvanic cell of claim 2 wherein a grease compound is disposed at the interface of the container and cover forming the seal.

4. In the galvanic cell of claim 3 wherein the grease compound comprises a silicone polymer.

5. In the galvanic cell of claim 1 wherein the container is made of a consumable anode material and thus functions as the anode of the cell.

6. In the galvanic cell of claim 1 wherein the rim is curled over the top surface of the cover forming an arcuate flange and wherein at least a portion of the gasket is compressed between the terminal edge of the flange and the top surface of the cover.

7. In the galvanic cell of claim 6 wherein the resiliently compressible elastomeric sponge gasket is composed of a large number of non-interconnected pores thereby providing a resealable vent closure at the interface of the cover and the rim of the container.

8. In the galvanic cell of claim 6 wherein a grease compound is disposed at the interface of the container and the cover forming the seal.

9. In the galvanic cell of claim 8 wherein the grease compound comprises a silicone polymer.

10. In the galvanic cell of claim 6 wherein the container is made of a consumable anode material and thus functions as the anode of the cell.

11. In the galvanic cell of claim 1 wherein the rim is turned over the top surface of the cover forming a substantially horizontal flange and wherein at least a portion of the gasket is compressed between the bottom surface of the flange and the top surface of the cover.

12. In the galvanic cell of claim 11 wherein the resiliently compressible elastomeric sponge gasket is composed of a large number of non-interconnected pores thereby providing a resealable vent closure at the interface of the cover and the rim of the container.

13. In the galvanic cell of claim 11 wherein a grease compound is disposed at the interface of the container and cover forming the seal.

14. In the galvanic cell of claim 13 wherein the grease compound comprises a silicone polymer.

15. In the galvanic cell of claim 11 wherein the container is made of a consumable anode material and thus functions as the anode of the cell.

* * * * *